(12) United States Patent
Germain et al.

(10) Patent No.: US 8,092,631 B2
(45) Date of Patent: Jan. 10, 2012

(54) APPARATUS AND DIE FOR WELDING PLASTIC AND A METHOD OF USE THEREOF

(75) Inventors: Jean-Paul Germain, Boucherville (CA); Steve Shannon, Otterburn Park (CA)

(73) Assignee: Solmax International Inc., Varennes-Quebec (CA)

( * ) Notice: Subject to any disclaimer, the term of this patent is extended or adjusted under 35 U.S.C. 154(b) by 0 days.

(21) Appl. No.: 12/395,839

(22) Filed: Mar. 2, 2009

(65) Prior Publication Data

US 2009/0277576 A1   Nov. 12, 2009

Related U.S. Application Data

(60) Provisional application No. 61/064,336, filed on Feb. 28, 2008.

(51) Int. Cl.
 *B29C 65/04* (2006.01)
(52) U.S. Cl. ............... 156/272.2; 156/274.4; 156/275.1; 156/380.6; 156/380.2; 156/580; 156/581
(58) Field of Classification Search ............... 156/275.1, 156/380.6, 273, 70, 349, 379.6, 379.8, 274.4, 156/380.4, 272.2, 580, 581, 380.2; 219/764, 219/765, 779, 778; 264/402, 403, 404, 405, 264/491, 496
See application file for complete search history.

(56) References Cited

U.S. PATENT DOCUMENTS

| | | | |
|---|---|---|---|
| 2,638,963 A * | 5/1953 | Malmberg et al. ............ 219/765 |
| 3,113,899 A * | 12/1963 | Hoag et al. ................. 156/274.4 |
| 3,354,020 A * | 11/1967 | Copeland ........................ 428/86 |
| 5,427,645 A * | 6/1995 | Lovin ............................ 156/367 |
| 5,624,511 A | 4/1997 | Lippman | |
| 5,635,014 A | 6/1997 | Taylor | |
| 5,725,711 A | 3/1998 | Taylor | |
| 6,030,490 A | 2/2000 | Francisco et al. | |
| 6,574,906 B1 * | 6/2003 | Meier et al. .................... 43/25.2 |
| 6,877,216 B2 | 4/2005 | Fukuda et al. | |
| 7,094,298 B2 | 8/2006 | Schwetz | |
| 2002/0133905 A1* | 9/2002 | Abramson et al. ............... 16/50 |
| 2004/0067327 A1 | 4/2004 | Cook | |
| 2005/0163953 A1 | 7/2005 | Johnstone | |

FOREIGN PATENT DOCUMENTS

| | | |
|---|---|---|
| CA | 2067681 | 6/1993 |
| CA | 2084843 | 6/1993 |
| CA | 2162039 | 11/1994 |
| CA | 2203677 | 5/1996 |
| CA | 2176689 | 12/1996 |

(Continued)

*Primary Examiner* — Richard Crispino
*Assistant Examiner* — Elizabeth Royston
(74) *Attorney, Agent, or Firm* — Fish & Richardson P.C.

(57) ABSTRACT

An apparatus for welding a first plastic sheet to a second plastic sheet is provided. The apparatus includes an elongate die including a channel extending longitudinally along the die's welding face. In combination with a plate and a high frequency alternating current generator, the die and the plate are operable to compress the first and second plastic sheets in an overlapping arrangement and generate a high frequency alternating electromagnetic field between the die and the plate and weld the first and second plastic sheets to one another. The depth of the die channel prevents the formation of an electromagnetic field that is strong enough to weld the first and second plastic sheets in an area between the die channel and the plate. A die for use in such an apparatus and a method of use thereof are further provided.

10 Claims, 3 Drawing Sheets

FOREIGN PATENT DOCUMENTS

| | | |
|---|---|---|
| CA | 2269756 | 6/1998 |
| CA | 2334353 | 2/2000 |
| CA | 2368006 | 8/2001 |
| CA | 2426938 | 5/2002 |
| CA | 2482023 | 10/2003 |
| CA | 2464387 | 8/2005 |
| GB | 2053084 A * | 2/1981 |
| GB | 2121355 A * | 12/1983 |

* cited by examiner

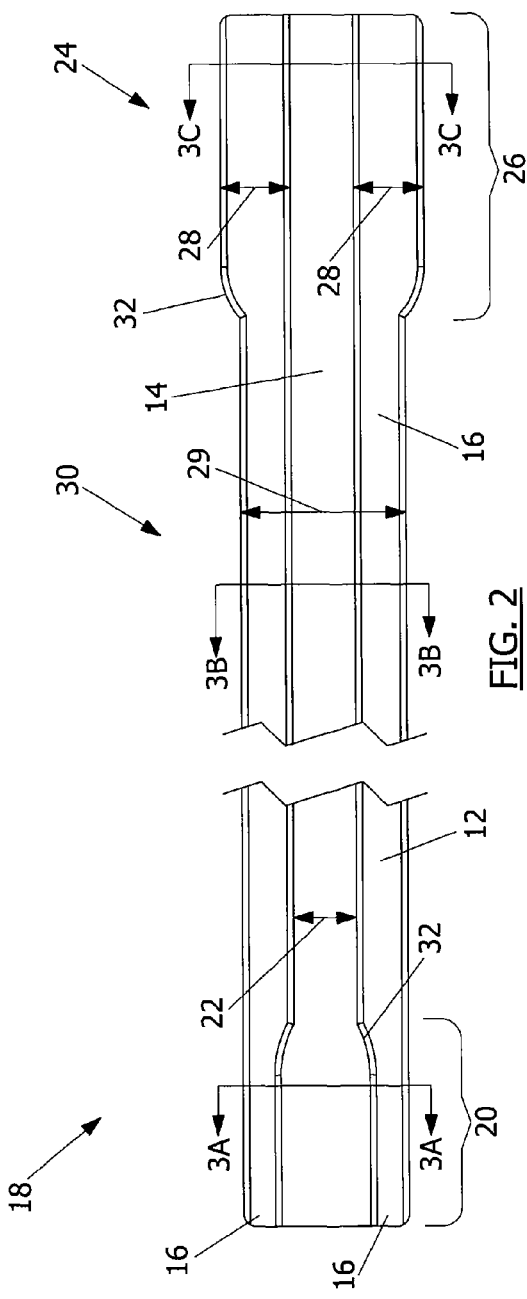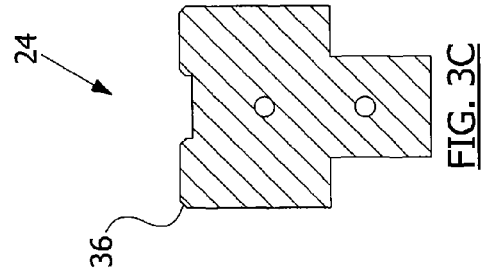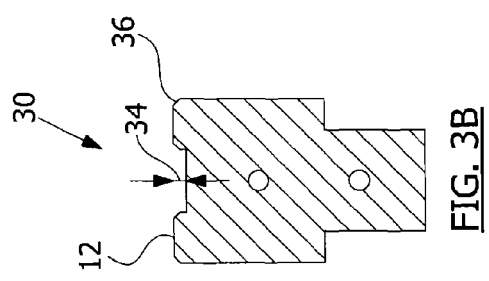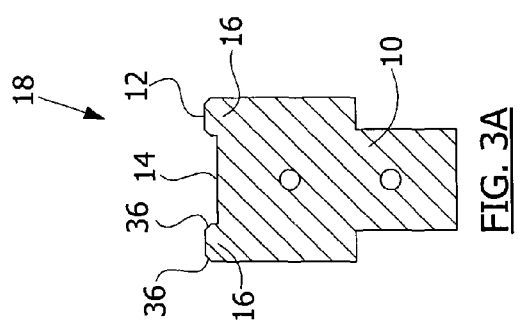

APPARATUS AND DIE FOR WELDING PLASTIC AND A METHOD OF USE THEREOF

FIELD OF THE INVENTION

The present invention relates to an apparatus for joining plastic sheets and the like. More particularly, and in its preferred intended use, the present invention relates to an apparatus for joining two plastic sheets by radio frequency welding, a die for use in such an apparatus and a method of use thereof.

BACKGROUND OF THE INVENTION

Apparatuses for joining plastic materials, and their methods of use, are well known in the art. Typically, two or more plastic pieces are heated so that the long chain molecules of the plastic material loosen as the material transitions to a liquid phase. When subsequently cooled, the long chain molecules intertwine and solidify, thereby fusing the two sheets together.

Various apparatuses and methods are known for welding plastics. For example, Hot Wedge welding applies heated elements directly to the plastic material, while Hot Air welding, as the name suggests, applies heated air to the material. It is also known to use a solvent to bond or otherwise chemically fuse plastic elements.

Also know in the art is the technique known as radio frequency (RF) welding, also referred to as high frequency or dielectric welding. Conventional RF welding involves pressing two or more plastic pieces between two conducting elements and passing high frequency electromagnetic waves, typically 13-100 MHz, therebetween. The alternating electromagnetic field excites the plastic's molecules and thereby generates heat within the material. The plastic material is also simultaneously compressed by the conducting elements, in addition to being heated by the RF field.

Canadian patents 2,334,353 and 2,269,756 (both to Franciso et al.) disclose RF welding devices for bonding thermoplastic pads to sections of carpet for use in automobiles. In addition, Canadian patents 2,067,681 (Lovin), 2,084,843 (Lovin), 2,162,039 (Vallot) and 2,426,938 (Cook) disclose RF welding devices for forming medical bags. Canadian patents 2,176,689 (Taylor), 2,203,677 (Lippman et al.), 2,368,006 (Miyama et al.), 2,464,387 (Schwetz) and 2,482,023 (Johnstone) all disclosure various other apparatuses involving RF welding.

RF welding is also commonly used to join large sheets of polyvinyl chloride (PVC), polyethylene or polyurethane in order to form larger panels. It is also possible to RF weld other polymers including nylon, PET, EVA and ABS resins.

Typically, a PVC sheet will be laid onto an extended metallic surface and a second sheet will be laid thereon in an overlapping manner. A metallic die is then pressed onto the overlapping section and the high frequency electromagnetic field is generated between the two metallic components. The die is typically formed from an elongate metal bar. The footprint of the die, i.e. the dimensions of the surface which presses against the PVC sheet, is typically around one inch in width and, depending on the size and type of equipment used therewith, can be four or five feet in length. As such, the RF welding apparatus will create welded areas roughly one inch wide and five feet long. Successive welds may be themselves overlapped in order to join sheets longer than five feet.

The advantages of RF welding over other forms of welding are known in the art. For example, Hot Wedge welding typically involves a portable welding unit which is run along two overlapping plastic sheets. This type of welding requires each joint be formed in a single pass and therefore the size of any resultant plastic panel is limited by the size of the area in which the welding is taking place. Furthermore, it is know that both Hot Wedge and Hot Air welding are not well suited to welding thinner materials, such as those having a thickness of 30 thousandths of an inch or less, wherein, for example, the heat source may be positioned very close to the material surface which can result in the rapid degradation of materials such as PVC.

In contrast, RF welding creates joints in a sequential, step-by-step process wherein a continuous welded joint may be formed by repeatedly overlapping successive RF welds. As such, while a 300 foot long factory will limit the length of a Hot Wedge welded panel to 300 feet, it is possible to form 900 feet long plastic panels in a similarly sized factory by RF welding.

RF welding can be used to assemble individual PVC sheets together to form larger panels. Such PVC sheets can be configured and joined to form curved surfaces for use, for example, in lining pools and the like. Such PVC sheets can also be used to provide water and moisture-proof barriers and liners for civil engineering projects such as waste containment and the like.

It is also known that many uses of welded plastic sheets, such as when used for civil engineering purposes, require testing of welded joints prior to installation.

One such test requires that the welded joint which joins two plastic sheets include two separate welded bands forming an air channel therebetween. Prior to installation, the strength and integrity of the weld is then tested by closing the longitudinal extremities of the air channel and injecting pressurised air therein via a needle. The specific pressure within the air channel and the length of time which it must withstand that pressure are pre-determined as a function of one or more factors, such as the temperature of the sheets. A sudden drop in pressure during testing would indicate a leak in the seal and hence a faulty weld.

However, creating such air channels typically requires that a conventional RF welding apparatus form two separate welds side-by-side, one after the other. Ensuring the consistency and alignment of these parallel welds can be very complex and time consuming.

It would therefore be advantageous to provide an apparatus for welding plastic material which incorporates an air channel into the welded joint.

It would further be advantageous to provide such an apparatus which is suitable for use on large plastic sheets, preferably in a factory setting rather than on-site, such that it may be operated in a controlled environment and the resultant welded panels may be delivered prior to installation as a finished testable product.

SUMMARY OF THE INVENTION

It is therefore an object of the present invention to provide an apparatus for welding plastic material which, by virtue of its design and components, satisfies at least some of the needs which are known in the art and is thus an improvement over other related known devices.

More specifically, it is object of the present invention to provide an apparatus for welding plastic which forms a joint including an air channel for testing purposes.

It is a further object of the present invention to provide a die for use in such an apparatus.

In accordance with an aspect of the present invention, there is provided an apparatus for welding a first plastic sheet to a second plastic sheet, the apparatus including:
  a) a die including an elongate body made of a conductive material, a welding face for engaging the first plastic sheet, and a die channel extending longitudinally along the welding face, the die channel having a depth;
  b) a plate made of a conductive material including a welding face for engaging the second plastic sheet, wherein the die and the plate are operable to compress the first and second plastic sheets in an overlapping arrangement between their respective welding faces;
  c) a high frequency alternating current generator for generating a high-frequency alternating electromagnetic field between the die and the plate, wherein the high-frequency alternating electromagnetic field and the compression of the first and second plastic sheets are operable to weld the first and second plastic sheets to one another; and
  wherein the depth of the die channel prevents the formation of an electromagnetic field that is strong enough to weld the first and second plastic sheets in an area between the die channel and the plate.

In accordance with another aspect of the present invention, there is provided a die for use in an apparatus for welding a first plastic sheet to a second plastic sheet, wherein the apparatus includes a plate including a welding face for engaging the first plastic sheet, and electromagnetic field generating means for generating an electromagnetic field between the die and the plate, the die including:
  a) an elongate body made of a conductive material;
  b) a welding face for engaging the first plastic sheet; and
  c) a die channel extending longitudinally along the welding face, the die channel having a depth;
  wherein the die is operable to compress between itself and the plate the first and second plastic sheets in an overlapping arrangement between their respective welding faces; and
  wherein the depth of the die channel prevents the formation of an electromagnetic field that is strong enough to weld the first and second plastic sheets in an area between the die channel and the plate.

Preferably, the die further includes a thinned portion at an end of the elongate body and/or an expanded portion at another end of the elongate body.

In accordance with yet another aspect of the present invention, a method of forming a welded joint between a first plastic sheet and a second plastic, the welded joint including an air channel, the method includes the steps of:
  a) providing a die including an elongate body made of a conductive material, a welding face for engaging the first plastic sheet, and a die channel extending longitudinally along the welding face, the die channel having a depth;
  b) providing a plate made of a conductive material including a welding face for engaging the second plastic sheet;
  c) placing the first and second plastic sheets between the welding faces of the die and the plate in an overlapping arrangement;
  d) generating a high frequency electromagnetic field between the die and the plate; and
  e) compressing the first and second plastic sheets between the die and the plate;
wherein the depth of the die channel prevents the formation of an electromagnetic field that is strong enough to weld the first and second plastic sheets in an area between the die channel and the plate.

The invention and its advantages will be better understood by reading the following non-restrictive description of a preferred embodiment thereof, made with reference to the accompanying drawings.

BRIEF DESCRIPTION OF THE DRAWINGS

FIG. 2 is a bottom view of portions of the die illustrated in FIG. 1.

FIGS. 3A to 3B are cross-sectional views taken along lines 3A-3A, 3B-3B and 3C-3C in FIG. 2.

DETAILED DESCRIPTION OF PREFERRED EMBODIMENT OF THE INVENTION

In the following description, the same numerical references refer to similar elements. The embodiment shown in the figures is preferred, for exemplification purposes only.

Although the preferred embodiment of the present invention as illustrated in the accompanying drawings comprises various components, etc., and although the preferred embodiment of the present invention as shown consists of certain geometrical configurations as explained and illustrated herein, not all of these components and geometries are essential to the invention and thus should not be taken in their restrictive sense, i.e. these components and geometries should not be taken as to limit the scope of the present invention. It is to be understood, as also apparent to a person skilled in the art, that other suitable components and cooperations therebetween, as well as other suitable geometrical configurations may be used according to the present invention, without departing from the scope of the invention.

Figure 1:
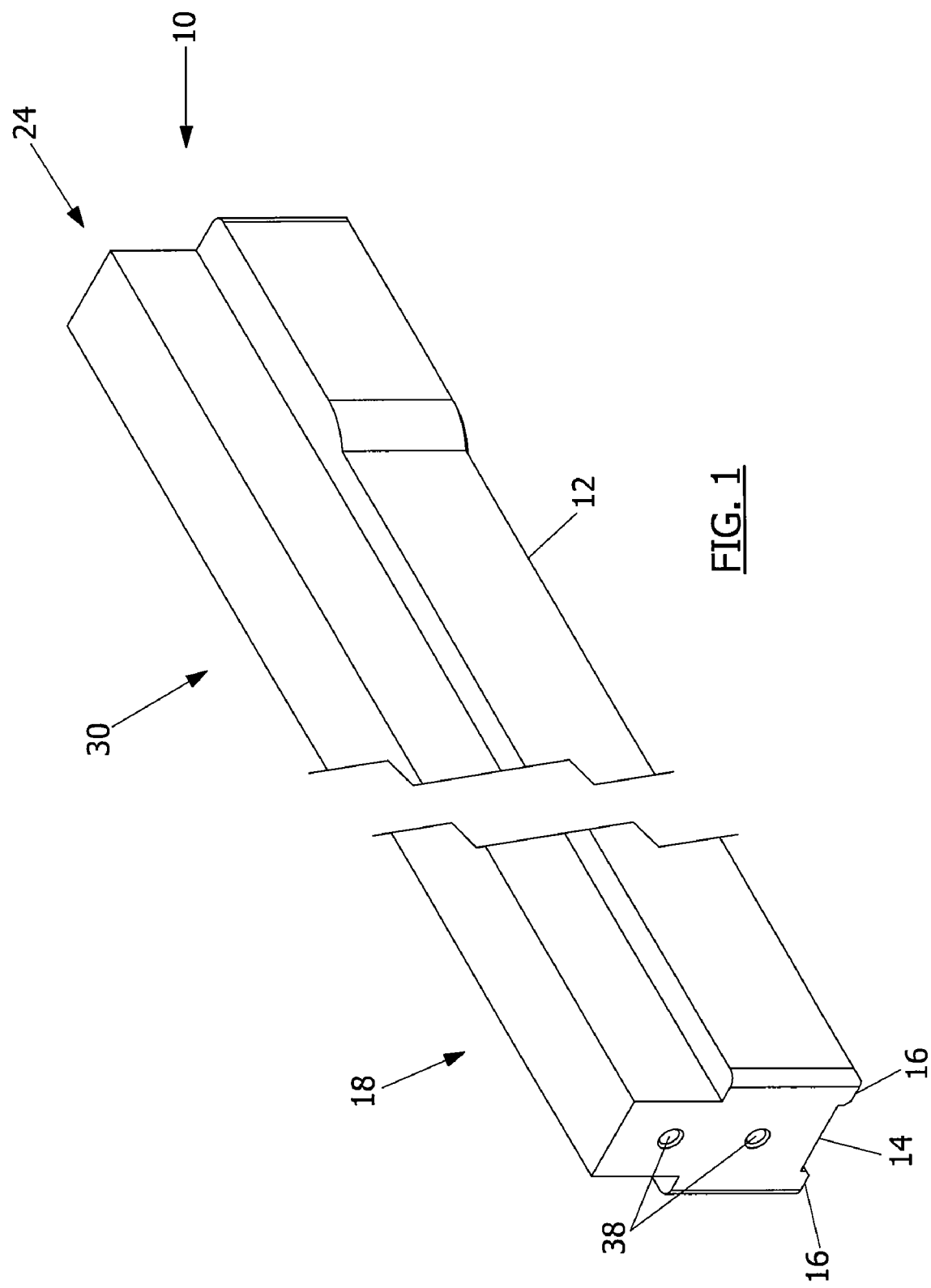
FIG. 1 is a perspective view of a die in accordance with an embodiment of the present invention.

With reference to FIG. 1, there is illustrated a die 10 for use in a high frequency welding apparatus. The elongate body of the die 10 is formed from a conducting material, such as aluminum. In use, one or more plastic sheets are pressed between the die 10 and another conducting element, such as a table or plate, as will be discussed in further detail with reference to FIG. 5. The die 10 includes a welding face 12 which, during welding, is pressed against one of the plastic sheets to be welded, preferably the topmost of the two (or more) sheets. It will be appreciated that "plastic sheet" should not be interpreted in a limiting sense but rather to include various types of weldable products.

A central die channel 14, which separates a pair of rails 16, is provided longitudinally along the welding face 12.

In a typical embodiment of the invention, the die 10 is approximately 5 feet long and 2 inches high. Of course, different dimensions may be considered depending on the needs of a particular application. As will be discussed below, the width of the die 10 preferably varies over its length.

With additional reference to FIG. 2, the welding face 12 and the channel 14 are shown in more detail. At a first end 18 of the die 10, a thinned portion 20 is preferably formed by the rails 16. In the illustrated embodiment, the thinned portion 20 is formed by reducing the width 28 of each rail 16 while increasing the width 22 of the channel 14 and keeping the overall width 29 of the die 10 unchanged. At a second end 24, the die 10 preferably includes and expanded portion 26 where the width 28 of the rails 16 is greater than over the remainder of the die 10 while the width 22 of the channel 14 remains unchanged.

A central portion 30 extends between the first and second ends 18 and 24. The widths 22 and 28 of the channel 14 and rails 16, respectively, are preferably constant over the central portion 30. The thinned portion 20 and the expanded portion 26 are preferably two and three inches in length, respectively. It will be appreciated however that variations of the geometries of the portions 20 and 26 are well within the scope of the present invention.

Preferably, the die 10 includes rounds 32 where the central portion 30 meets the thinned portion 20 and the expanded portion 26.

With additional reference now to FIGS. 3A to 3C, the channel 14 has a depth 34 and the rails 16 preferably include beveled edges 36 at the welding surface 12.

As seen in FIG. 1, the die 10 further includes interior conduits 38 which extend longitudinally through the die 10 and are operable to receive a cooling circuit, as is known in the art and will not be discussed further herein.

Figure 5:
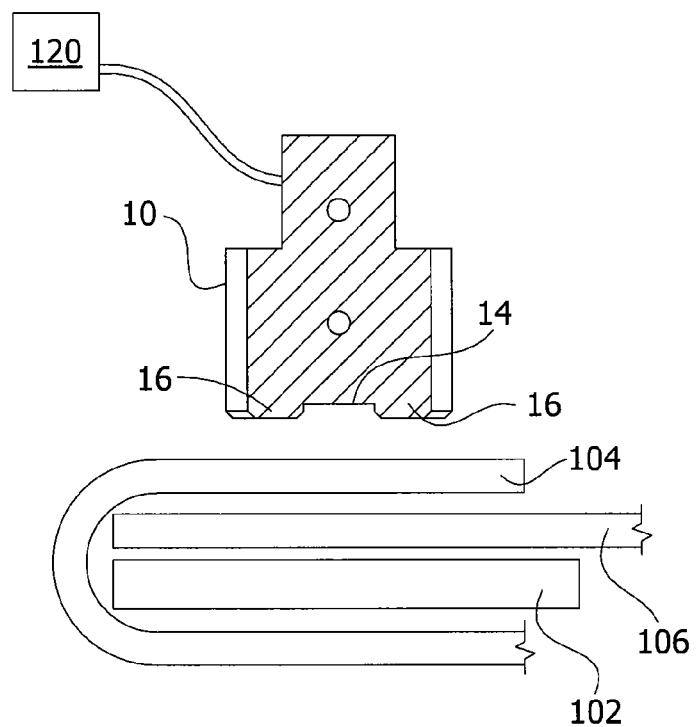
FIG. 5 is a cross-sectional view of an apparatus for welding plastic in accordance with an embodiment of the present invention.

With reference to FIG. 5, an apparatus 100 is shown in cross-section prior to welding. The apparatus includes the die 10, a plate 102 and a high frequency alternating current generating means 120 which generates the high-frequency electromagnetic field between the die 10 and the plate 102. As is known in the art, such alternating current generating means will typically include a rectifier or the like for converting the alternating current (AC) supplied by an alternating power source into a direct current (DC). This DC power is then converted by an oscillator which oscillates the amperage of the DC signal at a desired frequency. This high frequency DC power is then provided to the die, which in turn results in the high frequency electromagnetic field between the die 10 and the plate 102. As noted above, a high frequency field is typically considered to be in the range of 13-100 MHz, although 27 MHz is preferably used for RF welding.

In the illustrated embodiment of the apparatus 100, the alternating current generating means 120 is connected to the die 10 and the plate 102 is grounded. However, it will be appreciated that variations of this arrangement which similarly result in a high frequency magnetic field being generated between the die 10 and the plate 102 are within the scope of the present invention.

As shown, a first plastic sheet 104 and a second plastic sheet 106 are placed in an overlapping arrangement and are sandwiched between the die 10 and the plate 102. The heat created by the RF field liquefies the sheets 104 and 106 and the pressure applied by the die 10 and the plate 102 promotes their fusion. As is known in the art, the time required to weld the sheets 104 and 106 together increases with their thicknesses. In addition, the amperage supplied to the die 10 can also be increased for thicker sheets 104 and 106.

In addition to providing the conducting counterpart to the die 10, the plate 102 preferably provides an extended surface with which to support the plastic sheets 104 and 106. In the embodiment illustrated, the second plastic sheet 106 is laid upon the plate 102 and the first plastic sheet 104 is folded up from below plate 102. It will be appreciated however that various other means could be used, for example in conjunction with the plate 102, to similarly support the plastic sheets 104 and 106.

Preferably, the second sheet 106 is folded around the plate 102 in a C-shape during welding. As such, the free portions of the sheets 104 and 106 extend away from the apparatus 100 in the same direction, thereby reducing the floor space covered during welding and freeing up one side, in this case the left side, of the apparatus 100.

Figure 4:
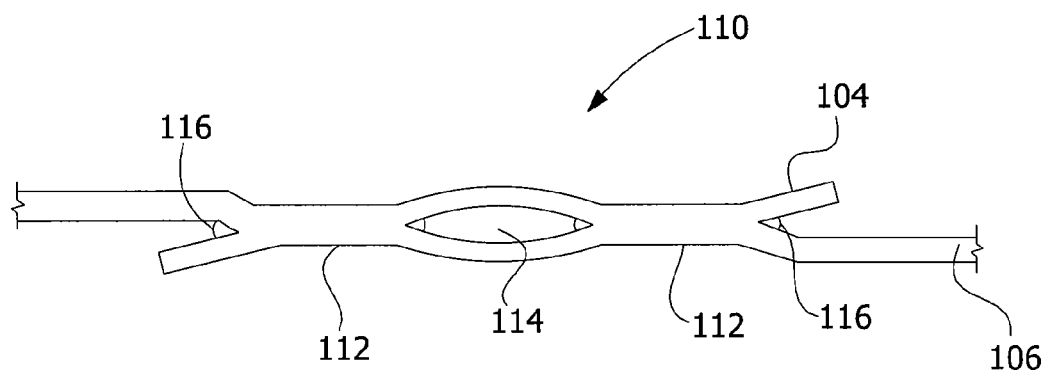
FIG. 4 is a cross-sectional view of a welded joint by an apparatus in accordance with an embodiment of the present invention.

Once cooled, the sheets 104 and 106 are joined by a welded joint 110, as shown in cross-section in FIG. 4. This joint 110 includes two parallel fused areas 112 separated by an air channel 114. The fused areas 112 correspond to the areas between the plate 102 and the rails 16. The air channel 114 corresponds to the area between the plate 102 and the die channel 14, which reduces the strength of the electromagnetic field locally between the channel 14 and plate 102, thereby preventing welding.

As discussed above, the air channel 114 is used for testing the integrity of the welded joint 110.

The minimum depth 34 of the die channel 14 required to form an air channel 114 has been found to be one thousandth of an inch (0.001 inches), although the depth 34 is preferably at least three thousandths of an inch (0.003 inches). This depth may be varied as a function of the properties of the sheets 104 and 106 to be welded. The depth 34 required to form the air channel 114 is further dependent on a number of factors. For example, a thicker or more elastic plastic sheet will deform when compressed and bulge between the rails 16. In such cases, it is preferable to provide a deeper die channel 14 in order to ensure the formation of an air channel 114. For general use, it has been found preferable to provide a die channel 14 having a depth 34 of between approximately 0.125 and 0.140 inches.

An individual weld formed between the die 10 and the plate 102 will form a welded area joining the first and second plastic sheets 104 and 106 which corresponds substantially to the welding face 12, i.e. the footprint of the die 10. As such, the welded area will similarly have a first end 18 having a thinned portion 20 and a second end 24 having an expanded portion.

The welded area will also be only as long as the die 10. To form a joint 110 which longer, the sheets 104 and 106 are repositioned within the apparatus 100 such that the die 10 is aligned with an extremity of the first weld and a second weld is then performed. As will be apparent, it is necessary that the first and second welds overlap in order maintain the seal created by the joint 110.

The first and second welds are aligned such that the thinned portion 20 of the die 10 at least partially overlaps the fused area 112 corresponding to the expanded portion 26 of the first weld. The reduced width 28 of rails 16 within the thinned portion 20 and the increased width 28 within the expanded portion 26 provide a number of advantages.

First, it known that repeatedly welding the same are of a plastic sheet may weaken it. As such, by reducing the footprint of the die 10 at the thinned portion 20, the die 10 advantageously reduces the overlapping fused areas 112, i.e. those areas which are welded twice. It will be appreciated however that while the reduction in the footprint of the die 10 over the thinned portion 20 is accomplished in the illustrated embodiment by increasing the width 22 of the channel 14 and decreasing the width 28 of the rails 16, other embodiments of the thinned portion 20 could be similarly advantageous.

Second, because of the size and elasticity of the sheets 104 and 106, it is difficult to perfectly align the first and second welds. As such, the expanded portion 26 provides an increased area in which to receive an overlapping thinned portion 20 and with which to accommodate any misalignment between the welds. Again, it will be appreciated that while the increase in the footprint of the die 10 over the expanded portion 26 is accomplished in the illustrated embodiment by increasing the width 28 of the rails 16, other embodiments of the expanded portion 26 could be similarly advantageous.

Thirdly, the above-mentioned integrity tests may require that the air channel 114 be of a specific width. If the width of the die channels 14 was the same at both ends 18 and 24 of the die 10, then a misalignment between the first and second welds will cause the fused areas 112 of one to overlap with the air channel 114 created by the other and thereby reduce the width of the eventual combined air channel 114. However, the thinned rails 16 in the thinned portion 20 will create a correspondingly thin fused area 112 and this thin fused area 112 is less likely to intrude into the air channel 114 of a previous weld in the event of a minor misalignment. Again, it will be appreciated that other embodiments of the thinned and expanded portions 20 and 26 could be similarly advantageous.

It is also known that fusing the plastic sheets 104 and 106 can result in areas of excess material 116 developing at edges of the fused areas 112. This is commonly referred to as "squeeze-out" and can also occur on the upper and lower surfaces of the first and second sheets 104 and 106, respectively. Squeeze-out is especially likely when welding thicker sheets 104 and 106 and these areas 116 can weaken the joint 110, especially in shear. The beveled edges 36 are therefore preferably provided to minimize the occurrence of such squeeze-out.

In addition, a release means, such as a layer of Teflon tape for example, can be provided on the welding surface 12 in order to help prevent the fused areas 112 from sticking to the die 10.

Of course, numerous modifications could be made to the above-described embodiment without departing from the scope of the invention, as apparent to a person skilled in the art. While a specific embodiment of the present invention has been described and illustrated, it will be apparent to those skilled in the art that numerous modifications and variations can be made without departing from the scope of the invention.

The invention claimed is:

1. An apparatus for welding a first plastic sheet to a second plastic sheet, the apparatus comprising:
    a) a die comprising an elongate body made of a conductive material which extends between opposed first and second ends, a welding face for engaging the first plastic sheet, and a die channel extending longitudinally along the welding face between the first and second ends, the die channel having a depth, the die channel being open at the first and second ends, and the die further comprising a thinned portion at one of the first and second ends, the thinned portion being formed by a widening of the die channel;
    b) a plate made of a conductive material comprising a welding face for engaging the second plastic sheet, wherein the die and the plate are operable to compress the first and second plastic sheets in an overlapping arrangement between their respective welding faces;
    c) a high frequency alternating current generating means for generating a high-frequency alternating electromagnetic field between the die and the plate, wherein the high-frequency alternating electromagnetic field and the compression of the first and second plastic sheets are operable to weld the first and second plastic sheets to one another; and
    wherein the depth of the die channel prevents the formation of an electromagnetic field that is strong enough to weld the first and second plastic sheets in an area between the die channel and the plate.

2. The apparatus of claim 1, wherein the die further comprises an expanded portion at one of the first and second ends.

3. The apparatus of claim 2, wherein the expanded portion is formed by a widening of the die.

4. The apparatus of claim 1, wherein the plate comprises an extended surface upon which to support one of the first and second plastic sheets.

5. The apparatus of claim 1, wherein the high frequency alternating current means is connected to the die and wherein the plate is grounded.

6. The apparatus of claim 1, wherein the welding face further comprises beveled edges.

7. A die for use in an apparatus for welding a first plastic sheet to a second plastic sheet, wherein the apparatus comprises a plate made of a conductive material and comprising a welding face for engaging the second plastic sheet, and a high frequency alternating current generating means for generating a high frequency electromagnetic field between the die and the plate, the die comprising:
    a) an elongate body made of a conductive material which extends between opposed first and second ends;
    b) a welding face for engaging the first plastic sheet;
    c) a die channel extending longitudinally along the welding face between the first and second ends, the die channel having a depth, the die channel being open at the first and second ends; and
    d) a thinned portion at one of the first and second ends, the thinned portion being formed by a widening of the die channel;
    wherein the die is operable to compress between itself and the plate the first and second plastic sheets in an overlapping arrangement between their respective welding faces; and
    wherein the depth of the die channel prevents the formation of an electromagnetic field that is strong enough to weld the first and second plastic sheets in an area between the die channel and the plate.

8. The apparatus of claim 7, wherein the die further comprises an expanded portion at one of the first and second ends.

9. The apparatus of claim 8, wherein the expanded portion is formed by a widening of the die.

10. The apparatus of claim 7, wherein welding face further comprises beveled edges.

* * * * *